(12) United States Patent
Wilsher

(10) Patent No.: US 8,416,472 B2
(45) Date of Patent: Apr. 9, 2013

(54) LED LIGHT GUIDE WITH INTEGRAL IR FILTER

(75) Inventor: Michael John Wilsher, Letchwroth (GB)

(73) Assignee: Xerox Corporation, Norwalk, CT (US)

( * ) Notice: Subject to any disclaimer, the term of this patent is extended or adjusted under 35 U.S.C. 154(b) by 376 days.

(21) Appl. No.: 12/776,918

(22) Filed: May 10, 2010

(65) Prior Publication Data
US 2011/0273750 A1   Nov. 10, 2011

(51) Int. Cl.
*H04N 1/04*   (2006.01)
(52) U.S. Cl. ......... 358/474; 358/475; 358/497; 358/498
(58) Field of Classification Search .................. 358/474, 358/475, 497, 498
See application file for complete search history.

(56) References Cited

U.S. PATENT DOCUMENTS

| | | | |
|---|---|---|---|
| 4,730,930 A * | 3/1988 | Thoreson et al. | 356/407 |
| 2006/0187500 A1 | 8/2006 | Sakurai | |
| 2007/0012490 A1* | 1/2007 | Wong et al. | 178/19.01 |
| 2007/0058359 A1* | 3/2007 | Saitoh et al. | 362/97 |

FOREIGN PATENT DOCUMENTS

JP   2006227384   8/2006

* cited by examiner

*Primary Examiner* — Houshang Safaipour
(74) *Attorney, Agent, or Firm* — MH2 Technology Law Group LLP

(57) ABSTRACT

Various embodiments provide illuminators and related scanner illuminating systems, wherein the illuminators can include one or more light guides with each including an IR filter and/or an IR-absorbing coating for removing an IR component from the light introduced in the light guide.

20 Claims, 6 Drawing Sheets

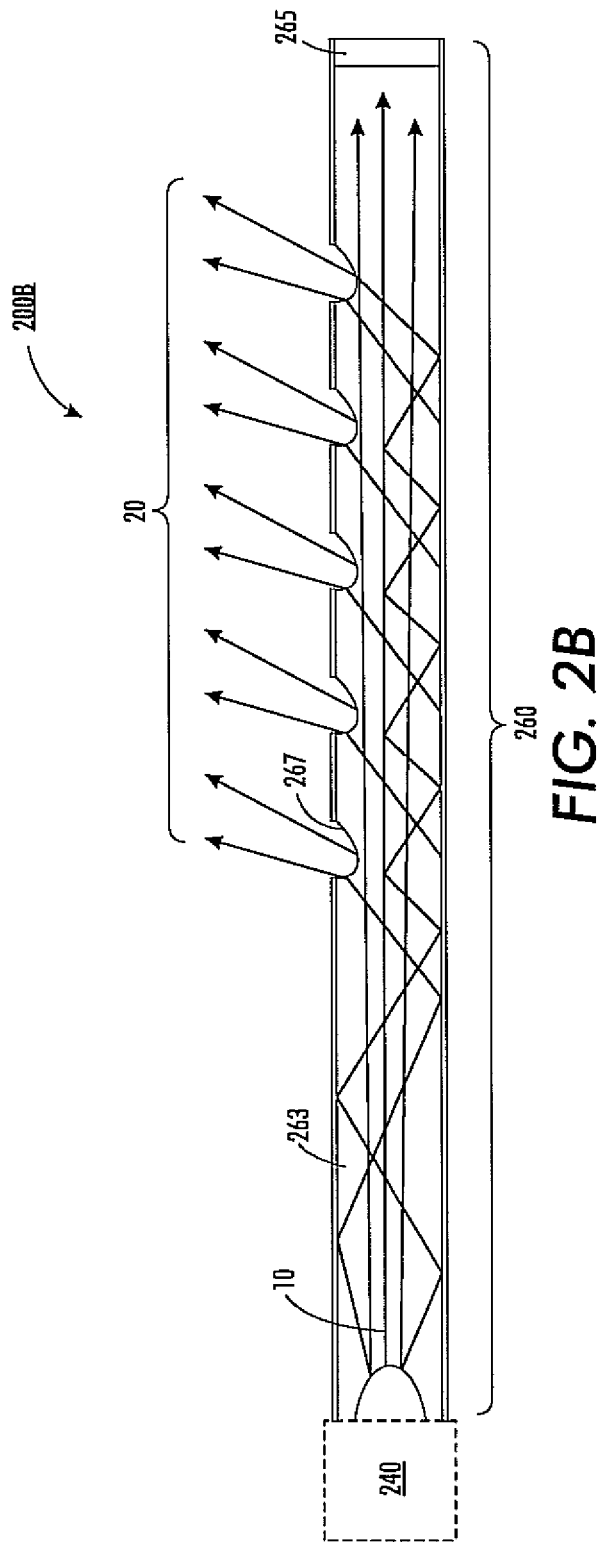

LED LIGHT GUIDE WITH INTEGRAL IR FILTER

DETAILED DESCRIPTION

1. Field of the Use

The present teachings relate generally to illuminators and, more particularly, to scanner illuminators and related illuminating systems having a light guide configured with an integral IR filter and/or an IR-absorbing coating.

2. Background

In office equipment, for example digital copiers and facsimile machines, original hard-copy documents are recorded as digital data using what can be generally called a "scanner." In a typical scanner, a document sheet is illuminated and the light reflected from the document sheet is recorded by a sensor element, e.g., a charge coupled device (CCD) array, contact image sensor (CIS) array, or a full width array (FWA), and converted to digital image data. A narrow strip of the document sheet is illuminated as the sheet is moved through a document handler, or the sensor element is moved relative to a platen on which the document sheet is placed.

Conventional scanner illuminators include a cold cathode lamp and an opposing mirror, a light emitting diode (LED) coupled with a light guide and an opposing mirror, or a LED bar having multiple LEDs and an opposing mirror. Some of the illumination comes direct from the lamp or LEDs and some is sent across to the mirror and then reflected to the document sheet. Another type of conventional scanner illuminators includes two sets of LEDs. Each set has multiple LEDs. The two sets of LEDs are configured in opposition and combined with a focusing lens to illuminate the document sheet.

These conventional scanner illuminators, however, emit an amount of energy in the far-red/near IR wavelength range, which can be reflected by the document and detected by the sensor element through an imaging lens for focusing the reflected light. The emitted IR component is undesirable and may cause errors in the sensed image. For example, the emitted IR component may produce a signal in the red channel indistinguishable from a "real" red signal. Media rich in IR reflectance may then produce a false red tint to the scanned image.

To remove the undesirable IR component, conventional methods include an IR filter configured over the imaging lens, when a CCD-based sensor element is used. The IR filter may also be conventionally configured over the sensor element, when a CIS or FWA based sensor element is used. Problems arise, however, because high quality IR filters are required when the filter is placed on the sensor element or close to the sensor element of the scanner. High quality IR filters, however, are expensive. Additionally, large IR filters are required to accommodate large sensor elements such as FWA. This can further increase the cost.

Thus, there is a need to overcome this and other problems of the prior art and to provide an illuminator configured to remove undesirable IR component.

SUMMARY

According to various embodiments, the present teachings include a scanner illuminator. The scanner illuminator can include one or more light guides and a light source coupled with the one or more light guides for emitting light into each of the one or more light guides and for diverting the emitted light outside of the light guide. An IR filter can be configured in a light path of the emitted light in order to filter out an IR component from the emitted light prior to the light diversion. For example, the IR filter can be configured at the light source and/or within each light guide.

According to various embodiments, the present teachings include another scanner illuminator. The scanner illuminator can include one or more light guides and a light source coupled with the one or more light guides for emitting light into each of the one or more light guides and diverting the emitted light outside of the light guide. The scanner illuminator can also include an IR-absorbing coating disposed on at least one surface portion of an interior surface of each light guide in order to absorb an IR component from the emitted light in the light guide.

According to various embodiments, the present teachings further include a scanner illuminating system. The scanner illuminating system can include a light source coupled with one or more light guides for emitting light into each light guide, wherein each light guide diverts the emitted light outside of the light guide to illuminate a document. Each light guide can include at least one of an IR filter configured in a light path of the emitted light prior to the light diversion to filter out an IR component and an IR-absorbing coating coated on one or more portions of an interior surface of the light guide to absorb an IR component from the emitted light in the light guide. The scanner illuminating system can also include a lens adapted to receive an imaging light reflected from the illuminated document and to focus the reflected imaging light onto a sensor element. The sensor element can generate an electronic signal corresponding to the reflected imaging light.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

FIGS. 2A-2C depict various exemplary illuminators useful for the system of FIG. 1 in accordance with various embodiments of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Various embodiments provide illuminators and related scanner illuminating systems. The illuminators can include a light source coupled with one or more light guides to emit light into each light guide. The emitted light from the light source can then be diverted outside of the light guide, for example, to illuminate a hard-copy document for digital recording. The light source and/or each light guide can include an IR filter and/or an IR-absorbing coating.

In embodiments, the IR filter can be configured in a light path of the emitted light prior to the light diversion. For example, the IR filter can be configured within the light source and/or within each light guide. In embodiments, the light source can include one or more light emitting diodes (LEDs), wherein the IR filter can be configured over each LED to filter out undesirable IR component from the light generated by the LED. In one embodiment, the IR component can be filtered out from the emitted light at the light source and prior to entering each light guide.

In embodiments, the IR-absorbing coating can be disposed on one or more portions of an interior surface of each light guide for absorbing undesirable IR component from the emitted light in the light guide.

Figure 1:
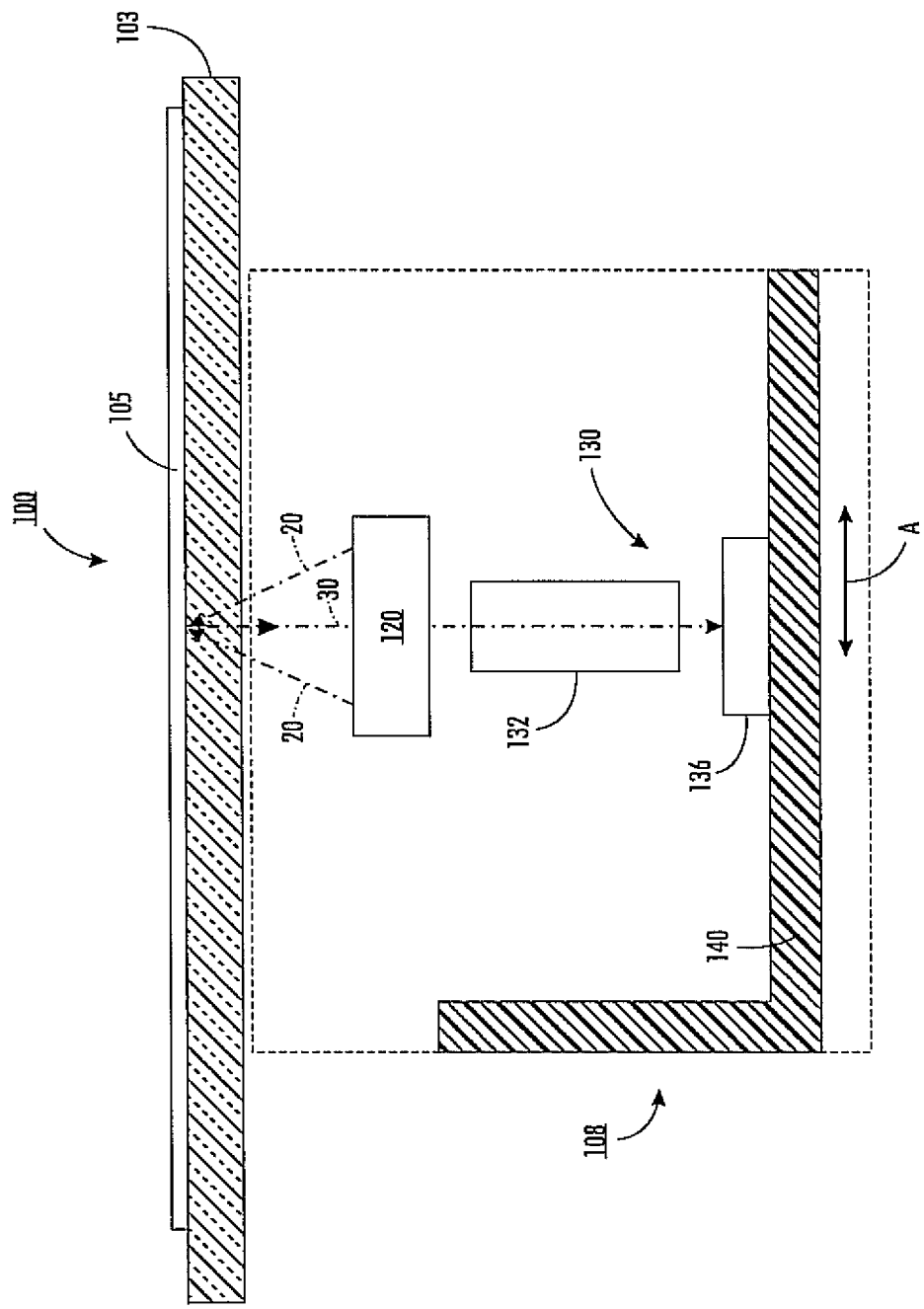
FIG. 1 depicts an exemplary scanner illuminating system in accordance with various embodiments of the present teachings.

FIG. 1 depicts an exemplary scanner illuminating system 100 in accordance with various embodiments of the present teachings. It should be readily apparent to one of ordinary skill in the art that the system 100 depicted in FIG. 1 represents a generalized schematic illustration and that other components/devices can be added or existing components/devices can be removed or modified.

As shown, the system 100 can include a platen 103 and a scan head 108. In embodiments, the platen 103 can have a distinct surface, on which a document sheet 105 can be placed for recording there-from. Optionally, associated with the platen 103 can be a document handler (not shown), which sequentially feeds sheets from a multi-page original document.

The scan head 108 can be mounted on a moveable carriage 140 for recording light reflected from images on document sheets. In general, the carriage can translate in direction A, as shown in FIG. 1. The scan head 108 can be positioned to illuminate the document and can include an illuminator 120 and a detector 130. Light 20 from the illuminator 120, which will be described in detail below, can illuminate a thin strip of the document.

The detector 130 can include a lens arrangement 132 and a photosensitive device 136. The photosensitive device 136 can include one or more linear arrays of sensor elements, for example, photosensors, to record the reflected light 30. The photosensors can include solid-state devices including, for example, CCD, CIS, FWA, or complementary metal oxide semiconductor (CMOS) devices.

The lens arrangement 132, including a SELFOC® lens or other microlens arrangements, can be interposed between the platen 103 and the photosensitive device 136 for focusing the reflected imaging light 30 on the photosensor array.

The light reflected from the document can be converted by the photosensitive device 136 into electronic signals forming imaged data, which electronically represent the document. The imaged data can be stored on a recording device such as a memory storage device in a computer.

Note that although FIG. 1 uses a platen scanning configuration as an example, one of ordinary skill in the art would understand that the disclosed scanner illuminators and related illuminating systems can be used in other scanning configurations including, for example, a bank note scanner or a scanner having a document handler to simultaneously scan two sides of a document sheet in a single pass.

Figure 2A:
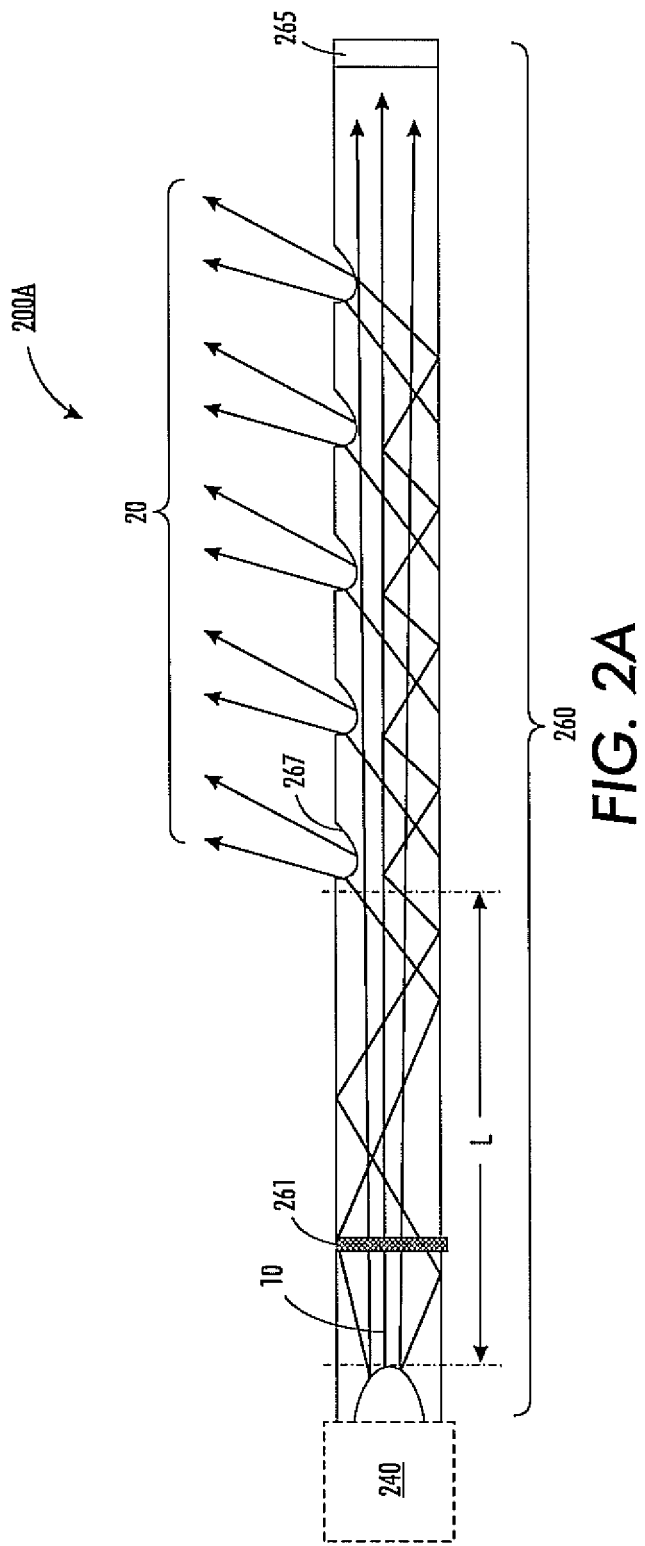
Figure 2C:
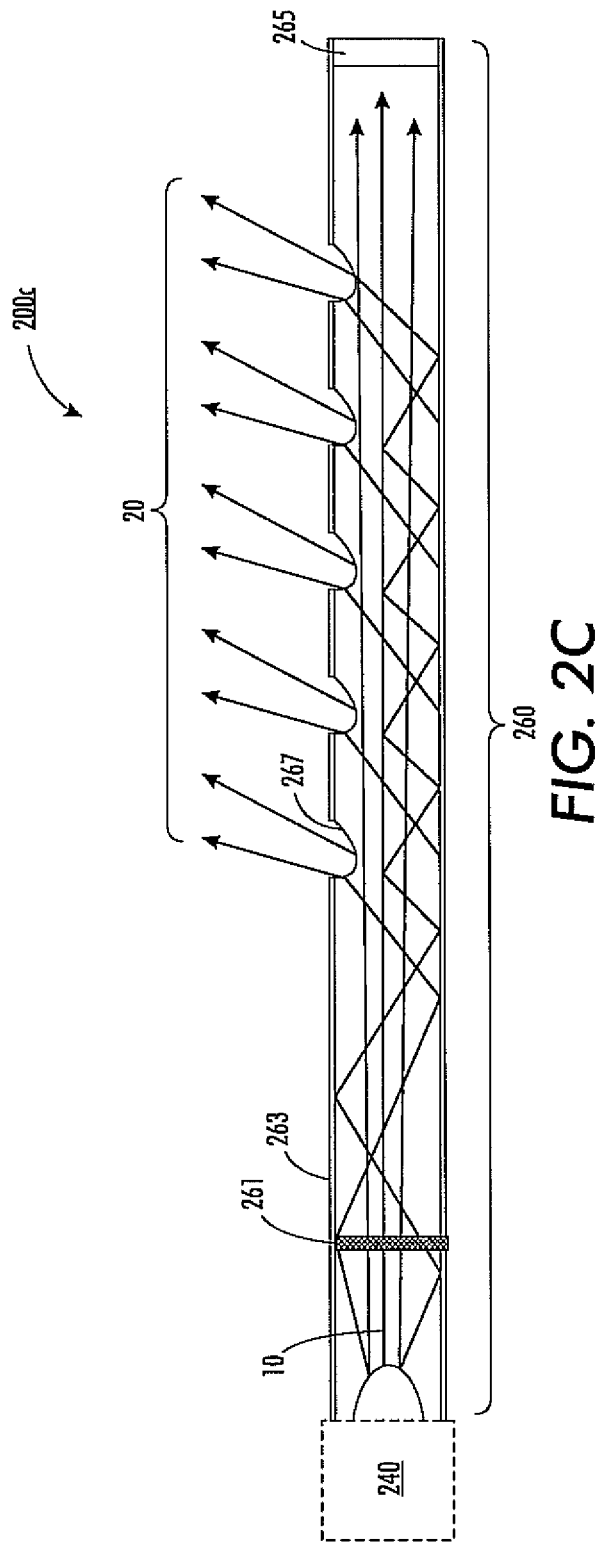

In embodiments, the illuminator 120 can include a light source in combination with light guide(s) for illuminating the document sheet. FIGS. 2A-2C depict various exemplary illuminators useful for the scanner illuminating system of FIG. 1 in accordance with various embodiments of the present teachings.

The exemplary illuminators 200A-C can include a light source 240 coupled with a light guide 260. The light source 240 can include, for example, one or more LEDs for emitting light into the light guide 260. In embodiments, the light source 240 can have a total illuminating power of, for example, about 1,000 lux or higher, or ranging from about 1,000 lux to about 30,000 lux, or exceeding about 30,000 lux, e.g., for high speed applications. In embodiments for low speed applications, the total illuminating power of the light source 240 can be about 1,000 lux.

The light source 240 can emit light 20. The emitted light 10 can be introduced into the light guide 260 and can be diverted outside of the light guide for illumination. For example, the light guide 260 can have a light-diverting surface structure 267 or a grid formed by a plurality of surface patterns such as lines. In embodiments, the plurality of surface patterns can be engraved, for example, laser engraved, or etched into predetermined surface(s) of the light guide 260. The plurality of surface patterns can cause a portion of the emitted light 10 to be diverted outside of the light guide 260. The diverted beam 20 can then be, for example, focused, and can illuminate the document (see FIG. 1).

In an exemplary embodiment, the light-diverting surface structure can be configured to provide a substantially uniform distribution of the diverted beam 20 out of the light guide and onto the document. Further, the diverted beam 20 can have a uniform distribution at a desired lighting level, e.g., using very narrow grid lines.

In embodiments, the light guide 260 can have a length of, for example, about 200 mm or longer, or ranging from about 200 mm (e.g., for A4 applications) to about 350 mm (e.g., for A3 applications), although other lengths such as more than about 350 mm can also be included. In embodiments, the light guide 260 can have a length smaller than 200 mm, for example, when used for applications such as bank note scanning. In embodiments, the light guide 260 can be formed of a material including, for example, a plastic or a glass.

In embodiments, the light guides can optionally have smooth specular reflecting interior surface. For example, a frosting or a reflective material 265, such as polished aluminum, can be used to cover one or more portions of an interior surface of the light guides such that the introduced light beam can not escape out of the light guide, but can be reflected back into the light guide. That is, light can be internally reflected within each light guide and escape only through, for example, diffused lines providing a grid line illumination.

In embodiments, the emitted light 10 can include undesirable IR component having a wavelength from about 650 nm to about 1200 nm, for example, where the sensor response can be fallen off. In embodiments, the undesirable IR component can be reduced, minimized, or eliminated from the emitted light 10 prior to being diverted to the outside of the light guide 260.

In one embodiment, undesirable IR component in the emitted light 10 can be filtered out by an IR filter 261 as shown in FIG. 2A. In another embodiment, the undesirable IR component in the emitted light 10 can be absorbed by an IR-absorbing coating 263 disposed on one or more portions of the interior surface of the light guide 260 as shown in FIG. 2B. In an additional embodiment, the light guide 260 can include a combination of the IR filter 261 and the IR-absorbing coating 263 configured to filter out and absorb the undesirable IR component from the emitted light 10 prior to its illumination on the document sheet.

Specifically, the IR filter 261 shown in FIGS. 2A and 2C can be configured over the light source and/or within the light guide 260 for filtering the emitted light 10 prior to the light diversion through the light-diverting surface structure 267. For example, the IR filter 261 can be configured over each exemplary LED of the light source 240 and/or within the light guide 260 to receive and filter out the undesirable beam from the emitted light. As shown in FIG. 2A, the IR filter 261 can be configured in any position along the length L between the light source 240 and the light-diverting surface structure 267.

In this manner, the IR filter 261 can block undesirable IR component at source (e.g., each LED) of the light path and eliminate conventional needs for large and/or high quality filters down stream the light path. Additionally, the emitted light can be scattered after the IR filter 261. Any imperfections in the filter can be diffused in the image and can be less noticeable as compared with a filter conventionally configured in the optical path where the filter is directly imaged.

In embodiments, any known IR filter can be used for the light guide 260 including, but not limited to, multi-layer filters, dichroic filters, and/or absorbing filters.

The IR-absorbing coating 263 shown in FIG. 2B-2C can be disposed on one or more interior surface portions of the light guide 260 to absorb undesirable IR component from the emitted light traveling in the light guide 260. Note that although the IR-absorbing coating 263 in FIG. 2B-2C is disposed on all interior surface of the light guide, one of ordinary skill in the art would understand that the IR-absorbing coating 263 can be partially or wholly cover the interior surface of the light guide 260.

In embodiments, the IR absorbing coating can provide low transmission of the undesirable IR component. In embodiments, the IR absorbing coating 263 can include various IR-absorptive dyes, for example, formed from a dye composition using standard liquid-coating process as known in the art.

In embodiments, the IR absorbing coating 263 can include one or more layers of dielectric, metal or semi-metal thin films. For example, the IR absorbing coating 263 can be formed of W, Ni, Ti, Si, Ta, $Al_2O_3$, $Cr_2O_3$, and/or $SiO_2$.

Figure 3A:
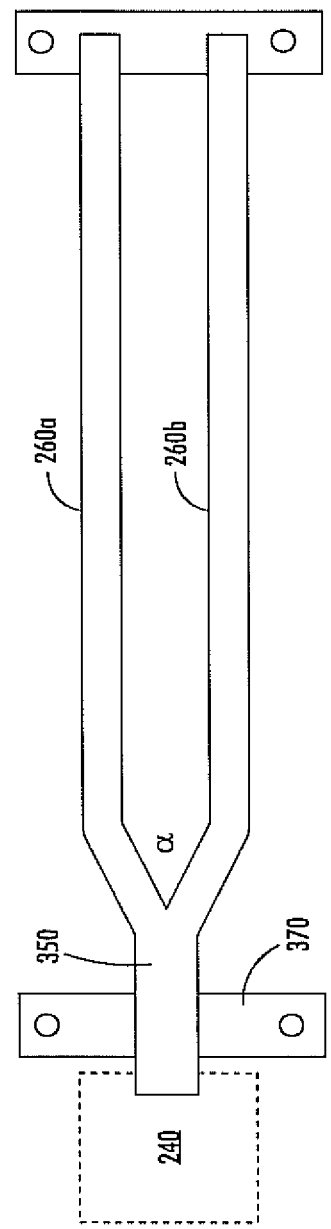
FIGS. 3A-3B depict various exemplary illuminators useful for the system of FIG. 1 in accordance with various embodiments of the present teachings.
Figure 3B:
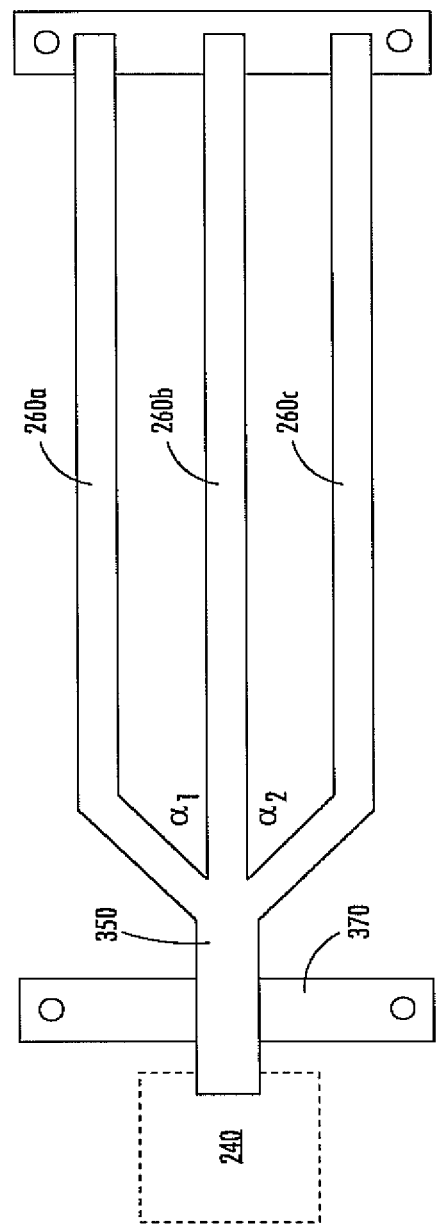

The disclosed IR filter 261 and/or IR-absorbing coating 263 can be used in the light guides with various configurations. For example, a plurality light guides 260 can be coupled with a light source 240 by a light splitter 350 as shown in FIGS. 3A-3B. In embodiments, each of the plurality of light guides 260 can be the same or different. The light source 240 and/or each of the plurality of light guides 260 can be configured with IR filter 261 and/or IR-absorbing coating 263 as shown in FIGS. 2A-2C.

The light splitter 350 in FIGS. 3A-3B can split light generated by the light source 240 into each light guide of the plurality of light guides 260. In embodiments, the light splitter 350 can provide necessary angular relationship between, for example, a first split beam (not shown) introduced into a first light guide 260a, a second split beam (not shown) introduced into a second light guide 260b, or a third split beam (not shown) introduced into a third light guide 260c, etc.

In the embodiment shown in FIG. 3A, through the light splitter 350, light ejected from the light source 240 can be directed into each light guide 260, for example, directed at a shallow angle such as about 30 degrees or turned through about 90 degrees and then coupled into the light guide, depending on the physical construction of the light splitter 350. In embodiments, the splitting angle α can range from 0 degree to about 90 degrees. The light splitter 250 can be a V-shaped light splitter or an L-shaped light splitter.

In the specific embodiment shown in FIG. 3B, the light splitter 350 can have splitting angles $α_1$ and $α_2$ in order to introduce light into three light guides 260a-c. The splitting angles $α_1$ and $α_2$ can be the same or different, for example, each ranging from 0 degree to about 90 degrees.

In embodiments, the light splitter 350 can provide equal or balanced beam path lengths along each light guide 260. In embodiments, as similarly indicated in FIGS. 2A, 2C, an IR filter can be configured within each light guide 260 in a light path of the split beam between the light splitter 350 and the light-diverting structure (see 267 in FIGS. 2A-2C). In embodiments, the IR filter can be configured over the light source 240, e.g., over each LED of the one or more LEDs. Likewise, an IR-absorbing coating (see 263 in FIGS. 2B-2C) can be disposed on one or more portions of the interior surface of each light guide 260 of FIGS. 3A-3B.

Note that although one light splitter 350 is shown in FIGS. 3A-3B, one of ordinary skill in the art would understand that one or more light splitters can be configured in each illuminator of FIGS. 3A-3B such that equal or balanced beam path lengths along each of a plurality of light guides 260 can be obtained.

In embodiments, the light source 240 can be, e.g., fixed to the light splitter 350, which can be mounted by a mounting assembly 370. The plurality of light guides 260 can also be mounted on an opposite side of the light splitter. The mounting assemblies 370 can include, for example, a mounting flange molded in a single plastic integral shape. The mounting assemblies 370 can provide an alignment geometric stability and a reduced alignment tolerance because the plurality of light guides 260 is molded together by the mounting assembly. Mounting and alignment issues occurred in the prior art can be eliminated.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising."

Further, in the discussion and claims herein, the term "about" indicates that the value listed may be somewhat altered, as long as the alteration does not result in nonconformance of the process or structure to the illustrated embodiment.

Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A scanner illuminator comprising:
   one or more light guides, wherein each of the one or more light guides comprise an outer surface comprising one or more light-diverting structures along the outer surface;
   a light source coupled with the one or more light guides for emitting light into each of the one or more light guides, wherein each light guide is configured to divert the light emitted in the light guide through the one or more light-diverting structures to an area outside and along a longitudinal surface of the outer surface of each of the one or more light guides; and
   an IR filter configured in a light path of the emitted light to filter out an IR component prior to the light diversion through the one or more light guides.

2. The illuminator of claim 1, wherein the IR filter is configured within the light source or within each light guide.

3. The illuminator of claim 1, wherein the light source comprises one or more light emitting diodes (LEDs), wherein the IR filter is configured over each LED to filter out the IR component from the light emitted by the LED.

4. The illuminator of claim 1, wherein the light source has an illuminating power of at least about 1,000 lux.

5. The illuminator of claim 1, wherein the IR component that is filtered out from the emitted light has a wavelength ranging from about 650 nm to about 1200 nm.

6. The illuminator of claim 1, wherein each light guide has a length of about 200 mm to about 350 mm.

7. The illuminator of claim 1, wherein each light guide has a length of less than about 200 mm for a bank note scanner.

8. The illuminator of claim 1, wherein a surface of each light guide comprises a plurality of surface patterns that is laser engraved or etched into the surface.

9. The illuminator of claim 1 further comprising a light splitter configured for splitting the emitted light from the light source into each light guide of a plurality of light guides; wherein the light splitter comprises a V-shaped light splitter or an L-shaped light splitter.

10. The illuminator of claim 1 further comprising a reflective material coated on an interior surface of each light guide.

11. A scanner illuminator comprising:
    one or more light guides, wherein each of the one or more light guides comprise an outer surface comprising one or more light-diverting structures along the outer surface;
    a light source coupled with the one or more light guides for emitting light into each of the one or more light guides, wherein each light guide is configured to divert the light emitted in the light guide through the one or more light-diverting structures to an area outside and along a longitudinal surface of the outer surface of each of the one or more light guides; and
    an IR-absorbing coating disposed on at least one surface portion of an interior surface of each of the one or more light guides, wherein the IR-absorbing coating absorbs an IR component from the emitted light in the one or more light guides.

12. The illuminator of claim 11, wherein the IR-absorbing coating comprises an IR-absorptive dye.

13. The illuminator of claim 11, wherein the IR-absorbing coating comprises a material selected from the group consisting of W, Ni, Ti, Si, Ta, $Al_2O_3$, $Cr_2O_3$, $SiO_2$, and a combination thereof.

14. The illuminator of claim 11, wherein the IR-absorbing coating absorbs the IR component at a wavelength ranging from about 650 nm to about 1200 nm from the emitted light.

15. The illuminator of claim 11, wherein a surface of each light guide comprises a light-diverting structure; wherein the light-diverting structure comprises a plurality of surface patterns that is laser engraved or etched into the surface.

16. The illuminator of claim 11, wherein a light splitter is configured for splitting the emitted light from the light source into each light guide of a plurality of light guides.

17. A scanner illuminating system comprising:
    a light source coupled with one or more light guides for emitting light into each light guide, wherein each light guide comprises an outer surface comprising one or more light-diverting structures along the outer surface operable to divert the light emitted in the light guide through the one or more light-diverting structures to an area outside along a longitudinal surface of the light guide to illuminate a document, and
    wherein each light guide further comprises at least one of an IR filter configured in a light path of the emitted light prior to the light diversion to filter out an IR component, and an IR-absorbing coating coated on one or more portions of an interior surface of the light guide to absorb an IR component from the emitted light in the light guide; and
    a lens adapted to receive an imaging light reflected from the illuminated document and to focus the reflected imaging light onto a sensor element, wherein the sensor element generates an electronic signal corresponding to the reflected imaging light.

18. The system of claim 17, wherein each of the filtered IR component and the absorbed IR component has a wavelength ranging from about 650 nm to about 1200 nm.

19. The system of claim 17, wherein the light source comprises one or more LEDs, and wherein the IR filter is configured over each LED.

20. The system of claim 17, wherein the sensor element comprises a charge coupled device (CCD), a contact image sensor (OS), a full width array (FWA), or a complementary metal oxide semiconductor (CMOS).

* * * * *